(12) United States Patent
Niarfeix et al.

(10) Patent No.: US 8,950,944 B2
(45) Date of Patent: Feb. 10, 2015

(54) INSTRUMENTED BEARING

(71) Applicants: Francois Niarfeix, Saint-Cyr (FR); Alexandre Taillepied, Saint Pierre des Corps (FR)

(72) Inventors: Francois Niarfeix, Saint-Cyr (FR); Alexandre Taillepied, Saint Pierre des Corps (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/934,559

(22) Filed: Jul. 3, 2013

(65) Prior Publication Data

US 2014/0010488 A1 Jan. 9, 2014

(30) Foreign Application Priority Data

Jul. 5, 2012 (EP) .................................... 12305809

(51) Int. Cl.
*F16C 41/00* (2006.01)
*G01P 3/44* (2006.01)

(52) U.S. Cl.
CPC ............... *F16C 41/007* (2013.01); *G01P 3/443* (2013.01); *F16C 2226/74* (2013.01)
USPC ........... 384/448; 384/446; 384/539; 384/564; 324/173

(58) Field of Classification Search
CPC .... G01P 3/443; F16C 41/007; F16C 2326/02; F16C 2226/74
USPC ......... 384/446, 448, 513, 539, 543, 561, 564; 324/166, 173–174
See application file for complete search history.

(56) References Cited

U.S. PATENT DOCUMENTS

| 4,259,637 | A | * | 3/1981 | Bloomfield et al. | .......... 324/166 |
| 4,525,082 | A | * | 6/1985 | Brandenstein et al. | ....... 384/138 |
| 5,264,790 | A | * | 11/1993 | Moretti et al. | ................. 324/174 |
| 5,583,431 | A | * | 12/1996 | Ouchi et al. | ................... 324/174 |
| 5,873,658 | A | | 2/1999 | Message et al. | |
| 6,053,637 | A | * | 4/2000 | Cacciatore et al. | ........... 384/448 |
| 6,231,241 | B1 | * | 5/2001 | Ohkuma | ........................ 384/448 |
| 6,520,683 | B2 | * | 2/2003 | Toda et al. | .................... 384/448 |
| 6,559,633 | B1 | * | 5/2003 | Nachtigal et al. | ........ 324/207.25 |
| 6,796,713 | B2 | | 9/2004 | Landrieve | |
| 6,908,229 | B2 | * | 6/2005 | Landrieve et al. | ............ 384/448 |
| 7,367,714 | B2 | * | 5/2008 | Niarfeix et al. | ............... 384/448 |
| 7,429,133 | B2 | * | 9/2008 | Gallion et al. | ................ 384/448 |
| 8,152,381 | B2 | * | 4/2012 | Walter et al. | .................. 384/448 |

(Continued)

FOREIGN PATENT DOCUMENTS

| EP | 447641 | A1 | * | 9/1991 | ................ G01P 3/44 |
| EP | 1431071 | A2 | * | 6/2004 | ............. B60B 27/00 |
| EP | 1431071 | A | | 11/2006 | |

(Continued)

*Primary Examiner* — Marcus Charles
(74) *Attorney, Agent, or Firm* — Bryan Peckjian; SKF USA Inc. Patent Dept.

(57) ABSTRACT

This instrumented bearing comprises a bearing and a sensor unit for sensing the angular position of the rotatable ring with respect to the fixed ring of the bearing, an encoder element which is fastened to the rotatable ring, and a sensing element fastened to the fixed ring, adapted to sense a parameter representative of the rotation speed of the rotatable ring. The sensing element is mounted in a casing fastened with the fixed ring. The casing provides a peripheral wall mounted on the fixed ring and which includes at least one snap portion adapted to be received in a recess of a surface of the fixed ring, and at least one axial blocking portion adapted to abut against a lateral surface of the fixed ring, perpendicular to the rotation axis of the instrumented bearing. Each snap portion and each blocking portion alternate around a central axis (X6).

16 Claims, 4 Drawing Sheets

(56) References Cited

U.S. PATENT DOCUMENTS

2004/0003665 A1* 1/2004 Landrieve ............... 73/854
2009/0208159 A1* 8/2009 Heim et al. ............. 384/448
2010/0135605 A1* 6/2010 Ishii et al. .............. 384/448
2010/0172605 A1* 7/2010 Pausch et al. ........... 384/446
2012/0200289 A1* 8/2012 Mock et al. ............. 324/238

FOREIGN PATENT DOCUMENTS

| | | | |
|---|---|---|---|
| JP | 2004340176 A | | 12/2004 |
| JP | 2012007706 A | * | 1/2012 ............ F16C 41/00 |

* cited by examiner

INSTRUMENTED BEARING

CROSS-REFERENCE

This application claims priority to European patent application no. 12305809 filed on Jul. 5, 2012, the contents of which are fully incorporated herein by reference.

TECHNICAL FIELD OF THE INVENTION

The invention relates to an instrumented bearing comprising a sensor unit for sensing the angular position of a rotatable element with respect to a fixed element.

BACKGROUND OF THE INVENTION

Instrumented bearings comprise a bearing and a sensor unit for sensing the angular position of a rotatable ring of the bearing with respect to the fixed ring. Such sensor units often include an encoder element, adapted to generate magnetic field variations, and a sensing element adapted to determine, on the basis of the magnetic field variations, the angular position of the rotatable ring. The sensing element is generally fixed with respect to the fixed ring of the bearing, thanks to a casing in which the sensing element is mounted.

To guarantee an accurate magnetic detection and an accurate rotation speed sensing, it is compulsory that the sensing element is accurately mounted on the bearing. It is known from EP-A-1 431 071 to mount a tubular snap portion of a sensor casing in a groove realized on a surface of the fixed ring of the bearing. As such a groove is generally obtained thanks to a turning operation, it offers a relatively low dimensional accuracy along its central axis. The mounting accuracy of the casing is therefore not satisfying.

SUMMARY OF THE INVENTION

The aim of the invention is to provide a new instrumented bearing comprising a sensor unit for sensing the angular position of a rotating element with respect to a fixed element, which is equipped with a mounting system allowing a better mounting accuracy between the bearing and the sensor unit.

To this end, the invention concerns an instrumented bearing comprising a bearing and a sensor unit for sensing the angular position of the rotatable ring with respect to the fixed ring of the bearing, comprising an encoder element, which is fast with the rotatable ring, and a sensing element fast with the fixed ring, adapted to sense a parameter representative of the rotation speed of the rotatable ring, the sensing element being mounted in a casing fast with the fixed element. This instrumented bearing is characterized in that the casing comprises a peripheral wall mounted on the fixed ring and which includes at least one snap portion adapted to be received in a recess of a cylindrical surface of the fixed ring, and at least one axial blocking portion adapted to abut against a lateral surface of the fixed ring, perpendicular to the rotation axis of the instrumented bearing, and in that the or each snap portion and the or each blocking portion are alternated around the central axis of the casing.

Thanks to the invention, the axial positioning of the casing is realized by the blocking portions against the lateral surface of the bearing, which is more accurately axially positioned than the groove of the fixed ring of the bearing. The mounting accuracy of the sensing element with respect to the rotatable ring is improved accordingly.

According to further aspects of the invention which are advantageous but not compulsory, such a sensor unit may incorporate one or several of the following features:
- There are at least two snap portions and at least two blocking portions.
- The blocking portions and the snap portions extend on alternate angular sectors.
- The snap portions are substantially of the same length in the circumferential direction.
- The blocking portions are substantially of the same length in the circumferential direction.
- The casing comprises five snap portions and five blocking portions and whereas the apex angles of the angular sectors have respectively a value approximately of 30°.
- Each snap portion and each blocking portion are provided on a same wall of the casing.
- The wall is cylindrical and centred on the central axis of the casing.
- The fixed ring is the outer ring of the bearing, whereas the recess is provided on the inner cylindrical surface of the outer ring and whereas the or each snap portion and the or each blocking portion are provided on an outer cylindrical wall of the casing.
- The maximal diameter of the or each snap portion, when non stressed by the outer ring, is superior to the minimal diameter of the recess.
- The recess has a diameter, which increases from the lateral surface towards a median plane of the bearing.
- The or each snap portion have a diameter which increases towards a median plane of the bearing.
- The or each snap portion has an inwardly bent end part adapted to slide against a tapered entry edge of the recess.
- The fixed ring is the inner ring of the bearing, whereas the recess is provided on the outer cylindrical surface of the inner ring and whereas the snap portions and the blocking portions are provided on an inner cylindrical wall of the casing.
- The bearing is of the rolling type and comprises rolling elements located between the fixed ring and the rotating ring.

BRIEF DESCRIPTION OF THE DRAWINGS

The invention will now be explained in correspondence with the annexed figures, as an illustrative example. In the annexed figures.

DETAILED DESCRIPTION OF THE INVENTION

Figure 1:
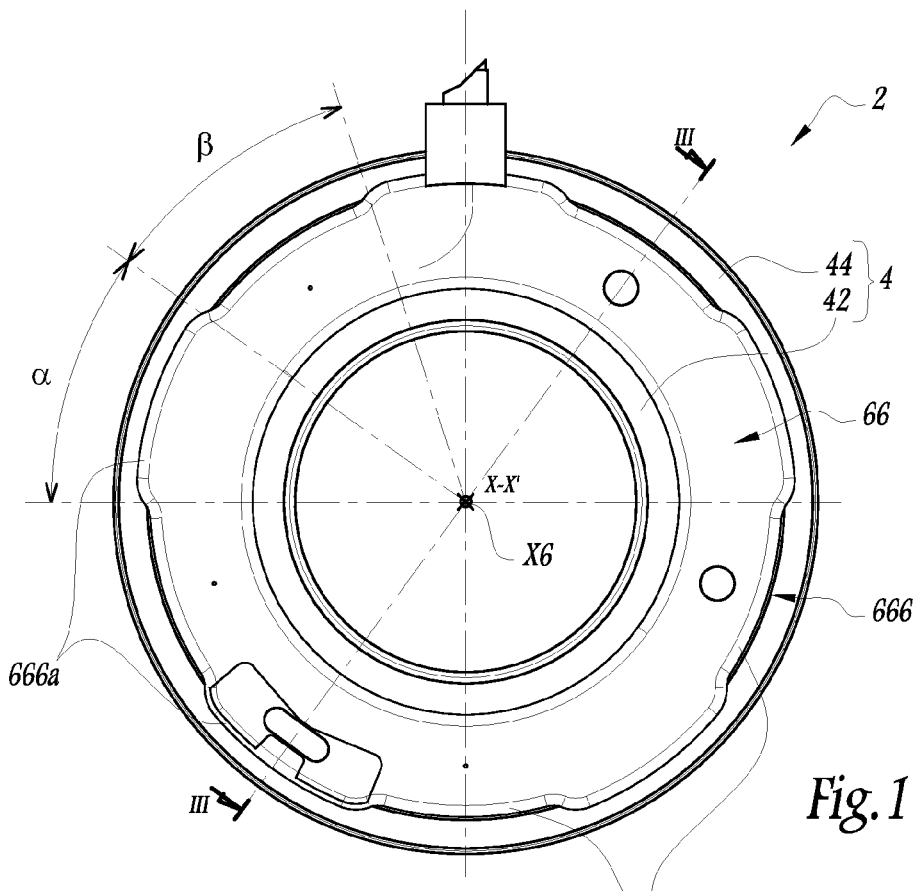
FIG. 1 is a front view of an instrumented bearing according to the invention.
Figure 2:
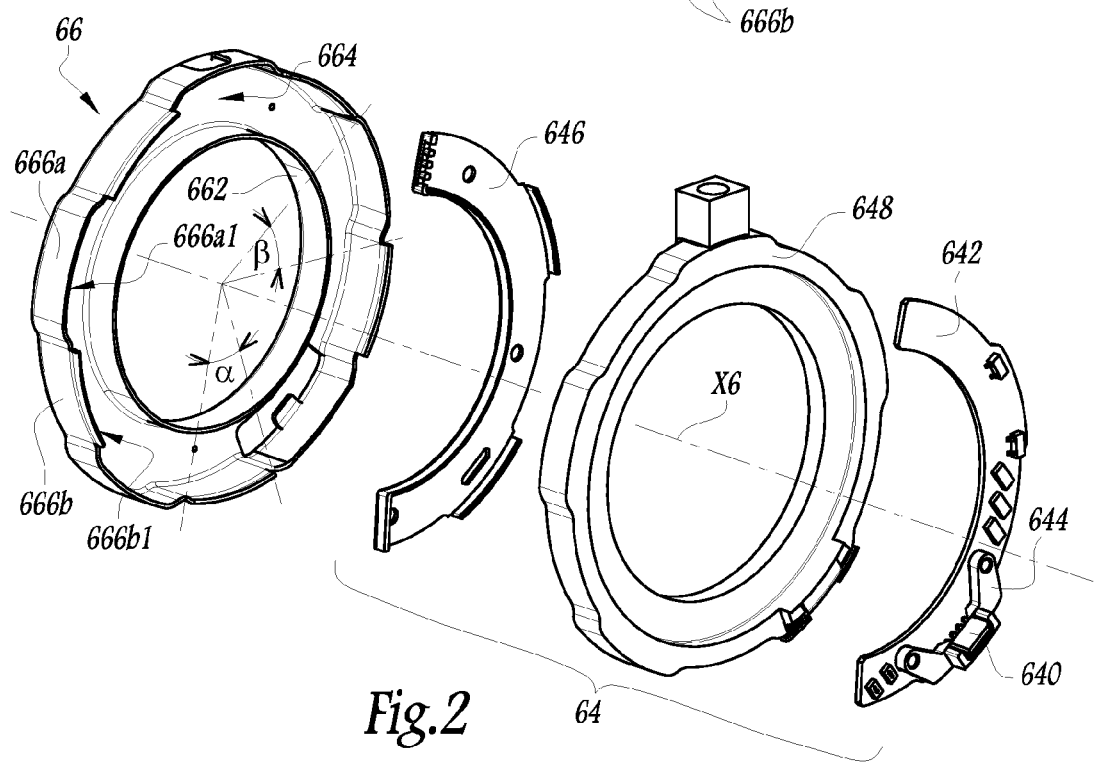
FIG. 2 is an exploded perspective view of a sensor body and a casing belonging to the instrumented bearing of FIG. 1.
Figure 3:
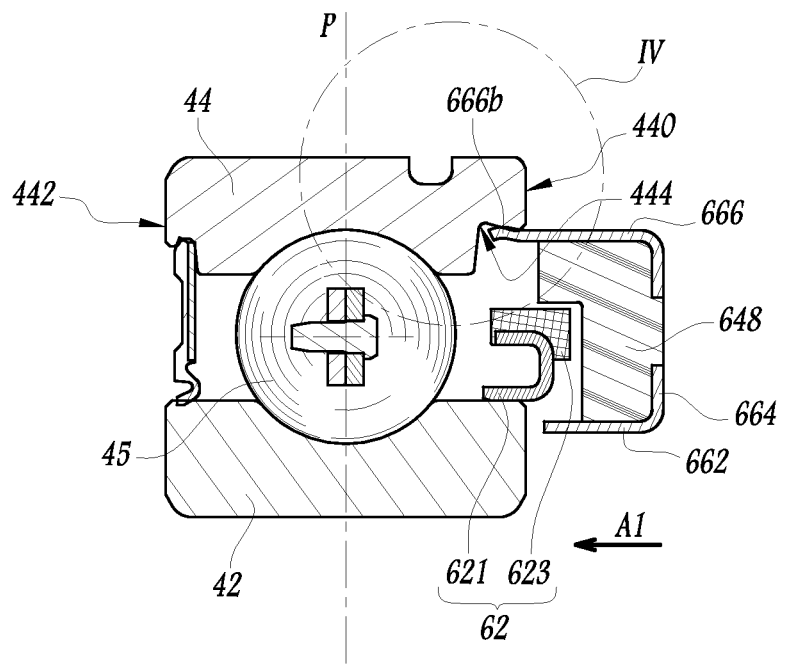
FIG. 3 is a sectional view along line III-III, of the instrumented bearing of FIG. 1.
Figure 3:
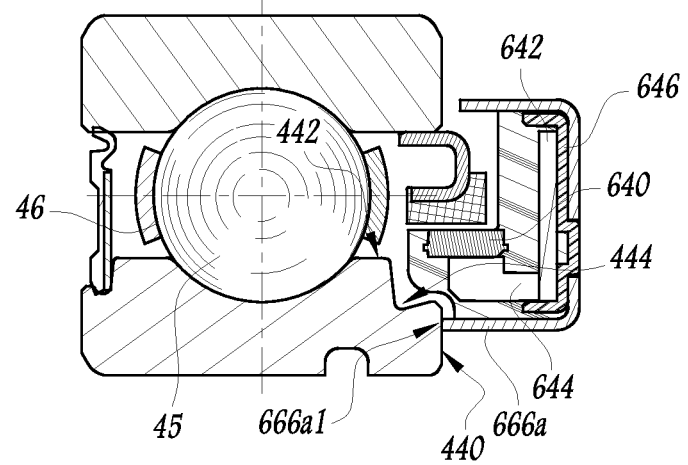
Figure 4:
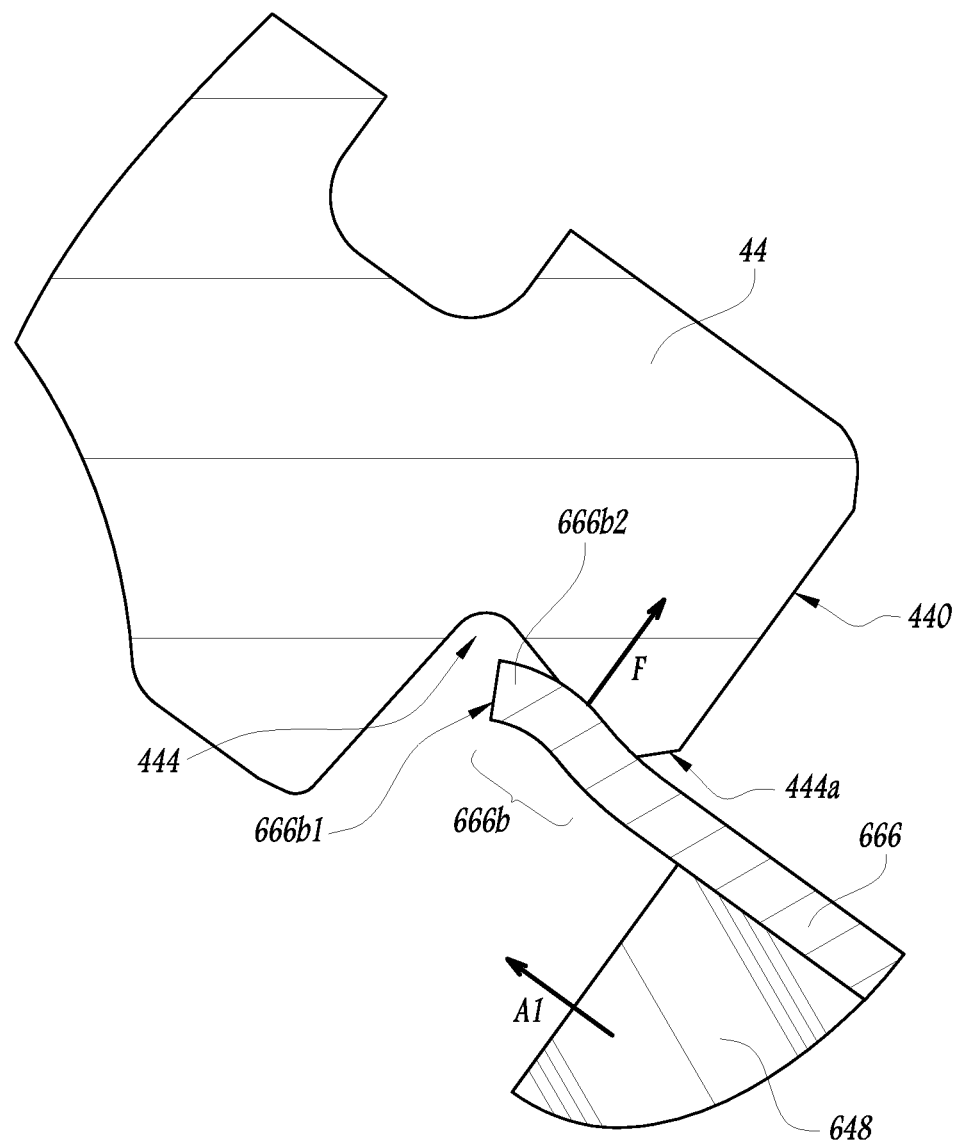
FIG. 4 is a view, at a larger scale, of detail IV on FIG. 3.

The instrumented bearing 2 represented on the figures comprises a rolling bearing 4 including a rotating inner ring 42 and a fixed outer ring 44. Several balls 45 mounted in a cage 46 are located between inner ring 42 and outer ring 44.

In a non-shown alternate embodiment, rolling bearing 4 may comprise other types of rolling element, such as rollers or needles. Inner ring 42 is rotatable with respect to outer ring 44 around a central rotation axis X-X' of rolling bearing 4.

Instrumented bearing 2 also comprises a sensor unit 6. Sensor unit 6 comprises an encoder element 62, fast with inner ring 42 and adapted to generate magnetic field variations as a function of its angular position. Encoder element 62 comprises a frame 621 and a magnetic ring 623. Magnetic ring 623 is fixed to frame 621, which is fast in rotation with inner ring 42.

Sensor unit 6 further comprises a sensor body 64, which is mounted in a shielding casing or yoke 66 fixed to outer ring 44. Sensor body 64 is centred on a central axis X6 of sensor 6, which is aligned with axis X-X' when sensor body 64 is mounted on outer ring 44. Sensor body 64 comprises a sensing element 640. Sensing element 640 is a transducer adapted to sense the magnetic field variations generated by the rotation of the magnetic ring 623 around axis X-X'. Sensing element 640 is mounted on and connected to a printed circuit board or PCB 642 thanks to a support member 644. PCB 642 is mounted in shielding casing 66. Shielding casing 66 is an annular shaped metallic part centred on axis X6 and which comprises an inner cylindrical wall 662, a radial bottom wall 664 perpendicular to axis X6 and an outer cylindrical wall 666. Walls 662 and 666 are centred on and parallel to axis X6.

Shielding casing 66 can be made of synthetic material and/or metallic material such as steel or Aluminium. Axis X6 is a central axis for shielding casing 66.

PCB 642 has a half-annular shape corresponding with the shape of shielding casing 66 and is mounted against bottom wall 664. As an optional feature, sensor body 64 may comprise a support plate 646, on which PCB 642 is mounted, support plate 646 being mounted against bottom wall 664 of shielding casing 66. Sensing element 640, support body 644, PCB 642 and support plate 646 are over-moulded in a layer 648 of plastic material injected in shielding casing 66. Alternatively, only sensing element 640 and PCB 642 are over-moulded in the layer 648 of plastic material; the element thus obtained is further glued onto the shielding casing 66, preferably onto its bottom wall 664.

Shielding casing 66 is directly fixed to outer ring 44 via outer cylindrical wall 666. Outer cylindrical wall 666 comprises alternated blocking portions 666a and snap portions 666b, which extend on equal angular sectors with respect to axis X64 along the circumferential direction of casing 66. Portions 666a and 666b are alternated around axis X6, that is along a circumferential direction of casing 66.

α denotes the apex angle of an angular sector including a blocking portion 666a, β denotes the apex angle of an angular sector including a snap portion 666b. Depending on the number of blocking portions 666a, the value of angle α and the value of angle β can vary and be adapted.

In the example of the figures, casing 66 includes five blocking portions 666a and five snap portions 666b and angles α and β are both approximately equal to 30°.

Optionally, snap portions 666b are substantially of the same length in the circumferential direction. In other words, apex angles β are equal to each other. In the same way, blocking portions 666a are optionally of the same length in the circumferential direction. In other words, apex angles α are equal to each other.

Blocking portions 666a permit to accurately position casing 66 with respect to a lateral surface 440 of outer ring 44. As an optional embodiment, lateral surface 440 preferably extends perpendicularly to axis X-X'. An axial edge 666a1 of each blocking portion 666a abuts against surface 440 along axis X-X'.

Snap portions 666b extend along axis X64 and protrude axially with respect to edges 666a1 towards balls 45. Thus, snap portions 666b can be inserted inside outer ring 44, which comprises, on its inner surface 442, a recess 444. As an optional embodiment, surface 442 is preferably cylindrical. P denotes a median plane of bearing 4, this plane being perpendicular to axis X-X' and located mid-way between lateral surfaces 440 and 442 of outer ring 44. The diameter of recess 444 increases from lateral surface 440 towards plane P. In a non-shown alternate embodiment, recess 444 can be replaced by a peripheral groove having the same function.

When not inserted in recess 444, snap portions 666b have a diverging shape, with a diameter which increases from the annular portion of wall 666 towards the free ends 666b1 of snap portions 666b. Thus, when not stressed by outer ring 44, the outer surface of snap portions 666b has a maximal diameter superior to the diameter of recess 444 at its minimal value, near lateral surface 440. Therefore snap portions 666b exert an outwardly directed elastic force F on recess 444, which guarantees the immobilization of casing 66 with respect to outer ring 44. More precisely, snap portions 666b guarantee the fastening in rotation of casing 66 with outer ring 44, by friction. The snap portion is preferably configured to be under tension to prevent radial displacement of the casing relative to the bearing.

The snap portions 666b guarantee also an accurate radial positioning of the sensor body 64 with respect to the encoder element 62.

Snap portions are provided, next to free ends 666b1, with end parts or noses 666b2 adapted to cooperate with a tapered entry edge 444a of recess 444 upon mounting of casing 66 in outer ring 44. Inwardly bent noses 666b2 defines a curved outer surface which slides on edge 444a, provoking an elastic deformation of snap portions 666b towards axis X-X' when they are inserted inside recess 444 along an axial direction parallel to axis X-X', as shown by arrow A1. When the insertion of snap portions 666b goes further, and until edges 666a1 come into abutment against lateral surfaces 440, snap portions 666b expand into the larger portion of recess 444.

The combination of snap portions 666b with blocking portions 666a permits to both fasten in rotation casing 66 to outer ring 44 and to accurately position sensing element 640 with respect to encoder element 62, improving the sensing accuracy of sensor unit 6. The encoder element and the sensing element are preferably disposed in facing opposition such that the sensing of rotation therebetween is unimpeded by material.

The alternation of snap portions 666b and blocking portions 666a along the circumferential direction of casing 66, that is around axes X6 and X-X', permits a satisfying mounting stability. The separation between the two functions allows a better working efficiency for both of them.

In order to obtain an optimal mounting, casing 66 comprises five blocking portions 666a alternated with five snap portions 666b. As a non-shown embodiment, casing 66 may comprise different numbers of blocking and snap portions, but comprises at least one blocking portion and one snapping portion and preferably two blocking portions and two snapping portions.

In an alternative embodiment, snap portions 666b can be inserted outside outer ring 44, in a recess made on its outer and preferably cylindrical surface.

According to a non-shown embodiment, the casing 66 comprises an outer cylindrical wall 666 but no radial bottom wall 664 nor inner cylindrical wall 662.

Figure 5:
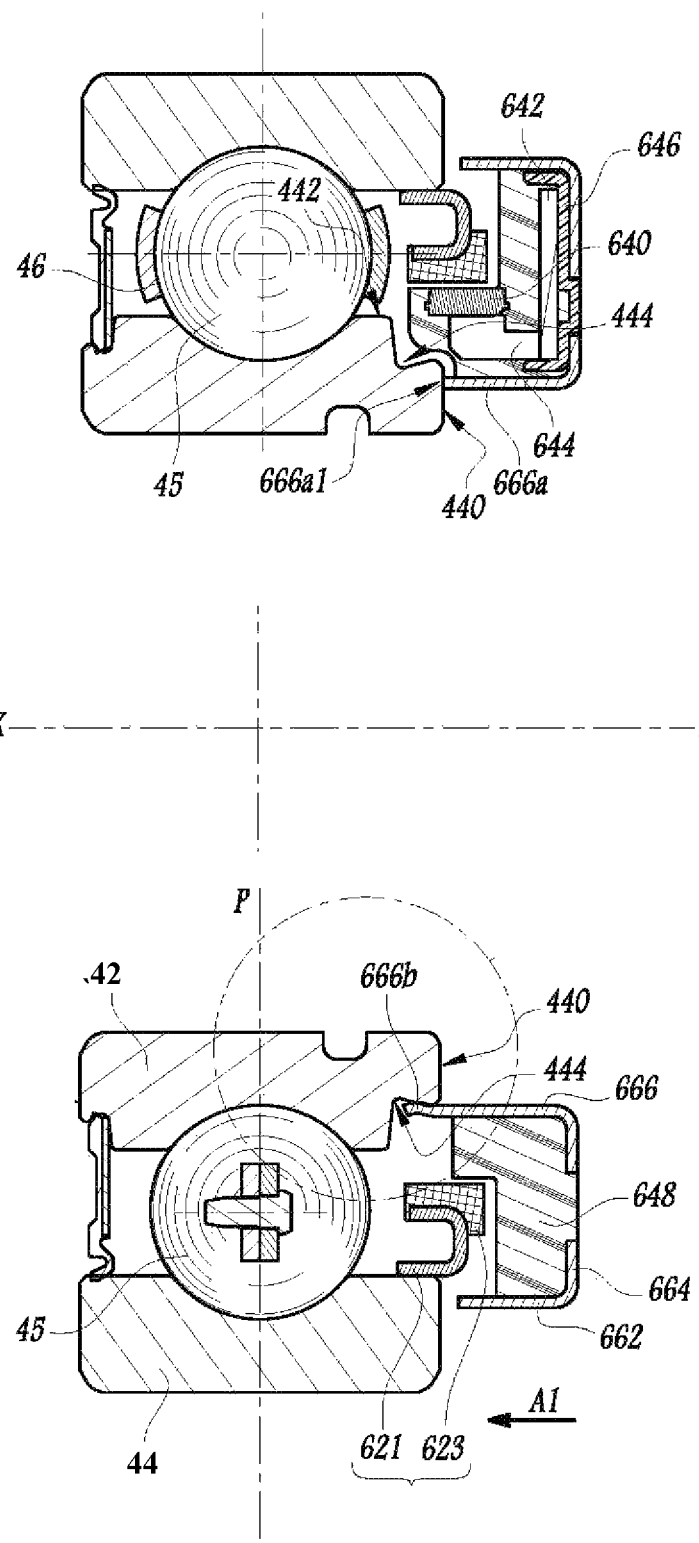
FIG. 5 is a sectional view similar to that of FIG. 3, of the instrumented bearing of FIG. 1, illustrating the fixed ring is the inner ring of the bearing wherein the recess is provided on an outer cylindrical surface of the inner ring and the snap portions and the blocking portions are provided on an inner cylindrical wall of the casing.

According to another the embodiment shown in FIG. 5, the rotatable ring may be outer ring 44, while casing 66 and sensing element may be fixed to non-rotatable inner ring 42. In such a case, the snap portions and the blocking portions can be provided on inner cylindrical wall 662 of casing 66 and the recess is provided on the outer or inner preferably cylindrical surface of the inner ring.

The technical features of the embodiments and variants considered here-above can be combined.

The invention claimed is:

1. An instrumented bearing comprising:
   a bearing, and
   a sensor unit for sensing the angular position of a rotatable ring with respect to a fixed ring of the bearing, wherein
   the sensor unit includes an encoder element which is fastened to the rotatable ring, and a sensing element fastened to the fixed ring, adapted to sense a parameter representative of the rotation speed of the rotatable ring, the encoder element and the sensing element disposed in facing opposition such that the sensing of rotation therebetween is unimpeded by material, wherein
   the sensing element is mounted in a casing fastened with the fixed ring, and wherein
   the casing provides a peripheral wall mounted on the fixed ring and provides at least one snap portion adapted to be received in a recess of a surface of the fixed ring, and at least one axial blocking portion adapted to abut against a lateral surface of the fixed ring, and wherein
   each snap portion and each blocking portion alternate with respect to each other around a central axis (X6) of the casing, wherein,
   the snap portion configured to be under tension to prevent radial displacement of the casing relative to the bearing.

2. The instrumented bearing according to claim 1 wherein there are at least two snap portions and at least two blocking portions.

3. The instrumented bearing according to claim 2, wherein the blocking portions and the snap portions extend on alternate angular sectors.

4. The instrumented bearing according to claim 3, wherein the snap portions are substantially of the same length in the circumferential direction.

5. The instrumented bearing according to claim 2, wherein the blocking portions are substantially of the same length in the circumferential direction.

6. The instrumented bearing according to claim 1, wherein each snap portion and each blocking portion are provided on a same wall of the casing.

7. The instrumented bearing according to claim 1, wherein the wall is cylindrical and centred on the central axis (X6) of the casing.

8. The instrumented bearing according to claim 1, wherein the bearing provides rolling elements located between the fixed ring and the rotating ring.

9. The instrumented bearing according to claim 1, wherein the sensor unit, encoder element, a support plate, a support member, and a printed circuit board are all encased by the casing.

10. An instrumented bearing comprising:
    a bearing, and
    a sensor unit for sensing the angular position of a rotatable ring with respect to a fixed ring of the bearing, wherein
    the sensor unit includes an encoder element which is fastened to the rotatable ring, and a sensing element fastened to the fixed ring, adapted to sense a parameter representative of the rotation speed of the rotatable ring, wherein
    the sensing element is mounted in a casing fastened with the fixed ring, and wherein
    the casing provides a peripheral wall mounted on the fixed ring and provides at least one snap portion adapted to be received in a recess of a surface of the fixed ring, and at least one axial blocking portion adapted to abut against a lateral surface of the fixed ring, and wherein
    each snap portion and each blocking portion alternate with respect to each other around a central axis (X6) of the casing, wherein
    there are at least two snap portions and at least two blocking portions, wherein
    the blocking portions and the snap portions extend on alternate angular sectors, wherein
    the casing includes five snap portions and five blocking portions, and wherein
    the apex angles ($\alpha$, $\beta$) of the angular sectors have respectively a value approximately of 30°.

11. An instrumented bearing comprising:
    a bearing, and
    a sensor unit for sensing the angular position of a rotatable ring with respect to a fixed ring of the bearing, wherein
    the sensor unit includes an encoder element which is fastened to the rotatable ring, and a sensing element fastened to the fixed ring, adapted to sense a parameter representative of the rotation speed of the rotatable ring, wherein
    the sensing element is mounted in a casing fastened with the fixed ring, and wherein
    the casing provides a peripheral wall mounted on the fixed ring and provides at least one snap portion adapted to be received in a recess of a surface of the fixed ring, and at least one axial blocking portion adapted to abut against a lateral surface of the fixed ring, and wherein
    each snap portion and each blocking portion alternate with respect to each other around a central axis (X6) of the casing, wherein
    the fixed ring is the outer ring of the bearing, wherein
    the recess is provided on the inner cylindrical surface of the outer ring, and wherein the or each snap portion and the or each blocking portion are provided on an outer cylindrical wall of the casing.

12. The instrumented bearing according to claim 11, wherein the maximal diameter of each snap portion, when non stressed by the outer ring, is superior to the minimal diameter of the recess.

13. The instrumented bearing according to claim 12, wherein the recess has a diameter, which increases from the lateral surface towards a median plane (P) of the bearing.

14. The instrumented bearing according to claim 13, wherein each snap portion has a diameter which increases towards a median plane (P) of the bearing.

15. The instrumented bearing according to claim 14, wherein each snap portion has an inwardly bent end part adapted to slide against a tapered entry edge of the recess (444).

16. An instrumented bearing comprising:
    a bearing, and
    a sensor unit for sensing the angular position of a rotatable ring with respect to a fixed ring of the bearing, wherein
    the sensor unit includes an encoder element which is fastened to the rotatable ring, and a sensing element fastened to the fixed ring, adapted to sense a parameter representative of the rotation speed of the rotatable ring, the sensing element is mounted in a casing fastened with the fixed ring, and wherein the casing provides a peripheral wall mounted on the fixed ring and provides at least one snap portion adapted to be received in a recess of a surface of the fixed ring, and at least one axial blocking portion adapted to abut against a lateral surface of the fixed ring, and wherein each snap portion and each blocking portion alternate with respect to each other around a central axis (X6) of the casing, wherein the fixed ring is the inner ring of the bearing, wherein the recess is provided on an outer cylindrical surface of an inner ring and wherein the snap portions and the blocking portions are provided on an inner cylindrical wall of the casing.

* * * * *